Feb. 11, 1941.  L. M. TAYLOR  2,231,037

VIBRATION DAMPENING DEVICE

Filed Nov. 30, 1939  4 Sheets-Sheet 1

INVENTOR
LESTER M. TAYLOR
BY
ATTORNEYS

Feb. 11, 1941.  L. M. TAYLOR  2,231,037
VIBRATION DAMPENING DEVICE
Filed Nov. 30, 1939   4 Sheets-Sheet 2

INVENTOR
LESTER M. TAYLOR
ATTORNEYS

Feb. 11, 1941. L. M. TAYLOR 2,231,037
VIBRATION DAMPENING DEVICE
Filed Nov. 30, 1939 4 Sheets-Sheet 3

INVENTOR
LESTER M. TAYLOR
BY
ATTORNEYS

Feb. 11, 1941.   L. M. TAYLOR   2,231,037
VIBRATION DAMPENING DEVICE
Filed Nov. 30, 1939   4 Sheets-Sheet 4

Patented Feb. 11, 1941

2,231,037

UNITED STATES PATENT OFFICE 2,231,037

VIBRATION DAMPENING DEVICE

Lester M. Taylor, Dayton, Ohio

Application November 30, 1939, Serial No. 306,842

16 Claims. (Cl. 267—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in its broadest aspect to devices for coupling at least two relatively rotatable members by a yielding means, capable of absorbing energy arising due to relative rotation of said members and dissipating at least a portion of said energy in the form of heat.

The invention proposes to connect at least two relatively rotatable members by a yielding medium, which will transmit a turning moment applied to one of said members, to the other of said members by pure shear stress, in combination with tensile or compressive stresses, within said yielding medium. The stress within said yielding medium may also be a combination of tensile, compressive and shear stresses.

The invention has many general applications of which a few are as follows:

The invention is applicable to use as a coupling means for connecting two shafts or other relatively rotatable elements, so as to effectively damp out torsional vibrations and to prevent the transmission of torsional vibrations from a vibrating one of said members to the other of said members. Such vibration dampeners are useful in connecting an inertia element to an internal combustion engine crankshaft to form a known type of torsional vibration dampener. I am aware that Roger K. Lee in his U. S. Patent No. 2,041,556 shows a vibration dampener which is one solution of the problem of damping vibration in proportion to the amplitude of the vibration, irrespective of the speed of the vibrating member, but in the operation of his dampener the rubber, or resilient material is subjected to forces of complex quality and varying amplitude throughout the operating angle of rotation and the resilient material is subjected to stresses of widely varying intensity throughout the volume of said material. Furthermore, the nature of his construction is such that the effective surface of his dampener covers an area transverse of the axis of rotation, and relatively larger than a cross section of the rotating shaft and its normal housing.

In modern aircraft propulsion units using metal propellers, it is particularly desirable to prevent engine vibrations from being transmitted to the propeller blades, since where the engine vibration frequency and the natural period of vibration of the propeller blades coincide, the amplitude of the propeller vibrations increase to a dangerous degree, which may result in propeller failure. The invention provides a novel solution to this problem by incorporating a yielding connection between the propeller hub and the engine crankshaft, which incorporates the energy absorption features above noted. The yielding connection forms an integral part of the propeller hub assembly and effectively damps out torsional vibration and also serves to absorb shocks due to gyroscopic forces acting on the propeller and transmitted in the usual types of construction directly to the engine crankshaft.

The invention is also peculiarly adapted to use as a shock absorber, either on automobiles, or other land vehicles, or as a shock absorbing unit in the landing gear of aircraft.

The yielding medium used as an energy absorbing means in the devices according to the invention is rubber, or a material having similar properties, when under stress.

The invention may also incorporate in addition to the energy absorbing yielding means, a friction device, to further dissipate energy.

The invention further contemplates the preloading of the yielding medium so as to obtain an increase in the energy absorbing characteristics of the yielding medium, under certain predetermined conditions.

The principal object of the invention is the provision of a vibration dampening, or shock absorbing coupling means between two relatively rotatable members, the coupling including a resilient bondable material bonded to retaining walls in said coupling, the resilient material in said coupling being subjected to a combination of shear and tensile or compressive stresses of uniform quality and of progressively increased intensity as the operative angle of displacement between said relatively rotatable members increases.

A further object of the invention is the provision of a hub construction for aircraft or marine propellers to dampen out vibration and prevent vibration in the propeller driving means from being transmitted to the propeller blades.

A further object of the invention is the provision of a shock absorber incorporating the features of the invention and suitable for use in connection with land vehicles or aircraft landing gear.

A further object of the invention is to provide a novel energy absorbing coupling means which is of simple construction and in which the energy absorbing medium is utilized in an efficient manner.

Other objects will become apparent by reference to the specification and drawings.

Various embodiments incorporating the novel features of the invention are illustrated in the accompanying drawings in which.

Figure 12:
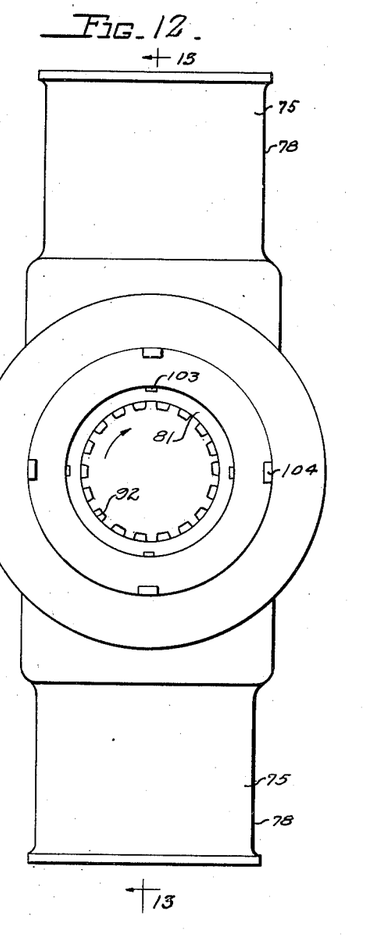
Fig. 12 is a front elevation of a propeller hub incorporating a shock absorbing device according to the invention.
Figure 13:
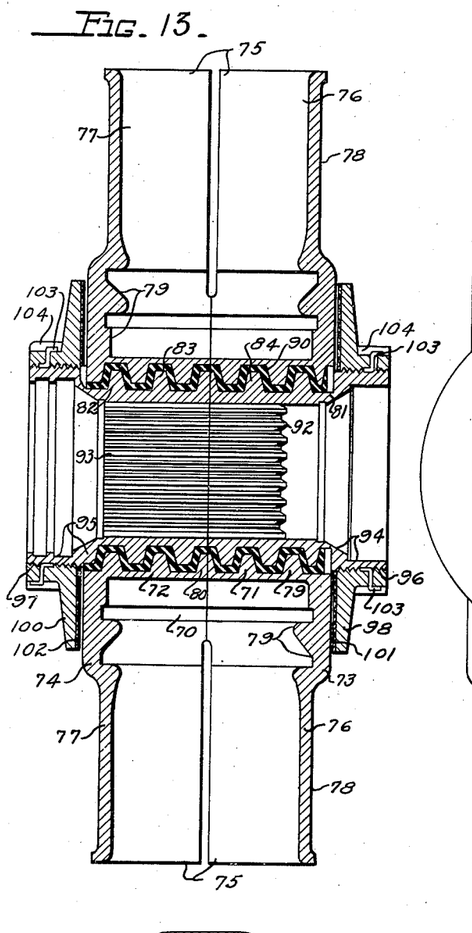
Fig. 13 is a sectional view taken along the line 13—13 of Fig. 12.

Similar parts have been given the same reference numerals in all of the figures with the exception of Figs. 12 and 13.

Figures 1, 1A, 2, 3:
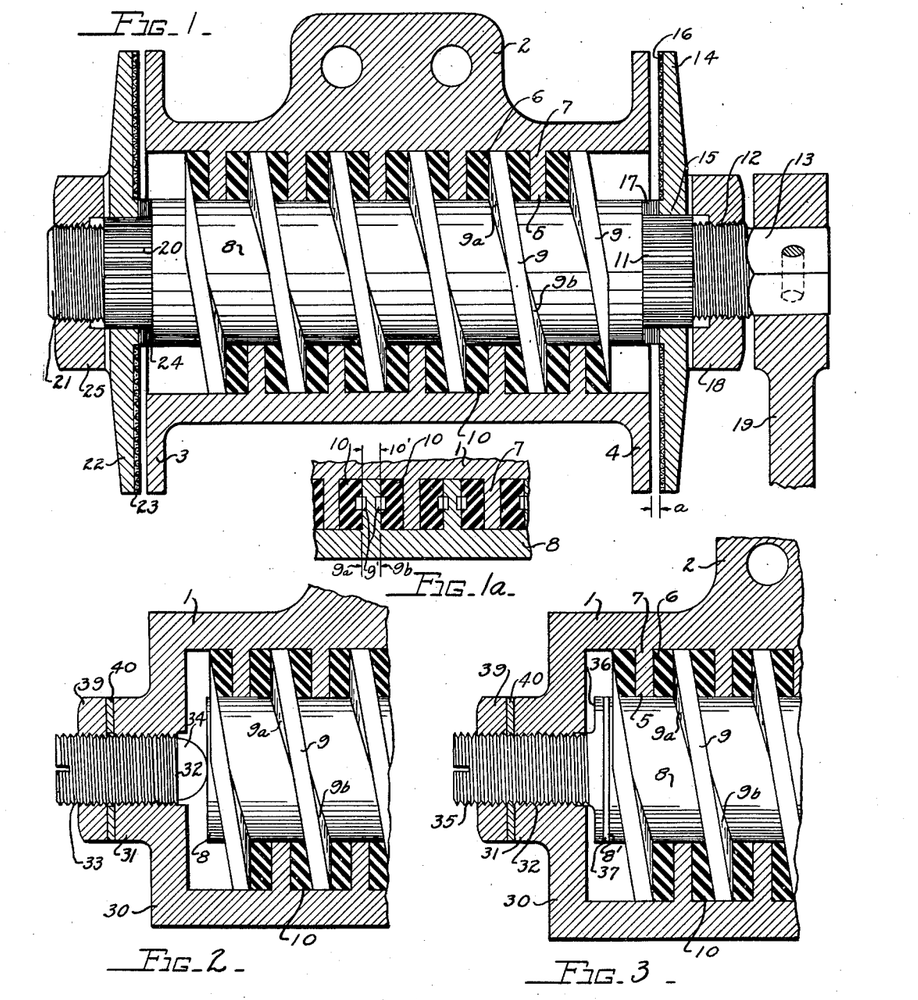
Fig. 1 is a front elevation partly in section illustrating the principal features of the invention.
Fig. 1a is a sectional view of an alternative arrangement of the rubber material in Fig. 1.
Fig. 2 is a view partly in section of a device similar to that of Fig. 1 but employing an antifriction stop.
Fig. 3 is a view partly in section of a device similar to that of Fig. 1 employing a different arrangement of the friction stop.

Referring to Fig. 1, the numeral 1 indicates a generally cylindrical housing preferably made of metal and having a mounting lug 2, formed integral therewith. The housing is provided with an annular flange 3 at one end and a similar flange 4 at its other end. The housing has a longitudinal central bore 5, and the inner wall of the housing is cut to form a helical groove of rectangular cross-section 6, forming a spiral projection or thread 7 on the casing inner wall. A cylindrical shaft 8, located within the bore 5, of the casing 2, is provided with an external helical thread 9 having faces 9a and 9b, the thread having the same pitch as the helical groove 6, but the width of the thread 9, being considerably smaller than the width of the spiral groove 6. The external diameter of the threaded portion 9, is of substantially the same diameter as the diameter of the groove 6, so that the shaft may be threaded into the housing, with the thread 9, contacting the bottom of groove 6 in the housing, which serves as a journal for the shaft 8. The portions of the shaft 8 between adjacent parts of the thread 9 is of substantially the same diameter as the bore 5 so that the thread 7 of housing 2 is in contact with the shaft 8.

In the normal position the thread 9, of shaft 8, is spaced centrally of the groove 6 and the space between the threads 7 and 9 is filled with a resilient material 10, which is preferably a rubber compound, or a similar material, which is bonded by a vulcanizing process to the side walls of the threads 7 and 9 of the casing 2 and shaft 8, respectively. The rubber compound does not extend beyond the terminal portions of the thread 9, on the shaft 8. The rubber compound may be forced into the space between the threads by means of an injection type plastic molding machine, the rubber compound being heated sufficiently to be plastic. The entire assembly is then heated to vulcanize the rubber which becomes firmly bonded to both the casing and the shaft.

At one end the shaft 8 has a reduced diameter splined shoulder portion 11, a further reduced diameter threaded shoulder portion 12, and terminating in a squared end portion 13. A disc 14, having a central splined opening 15, is mounted on the splined shoulder portion 11, of shaft 8. Thin washers 17 space the disc 14, from the shoulder on shaft 8 and the disc is secured against axial movement relative to shaft 8 by a lock nut 18, threaded on the threaded shouldered portion 12, of shaft 8. A lever 19, is fitted on the squared end portion 13, of shaft 8, to impart angular rotation thereto.

Upon its inner face the disc 14, is provided with a layer of friction material 16, similar to that used for brake lining, which cooperates with the face of the annular flange 4, of the casing 1, to serve as a friction energy absorbing means and also as a stop to limit relative axial movement between the shaft and housing.

Upon its other end the shaft 8 projects beyond the casing 1 and is formed with a reduced diameter splined portion 20 and a threaded portion 21, similar to the splined and threaded portions 11 and 12, respectively. A splined disc 22, having a friction face 23, is mounted in an identical manner to the mounting of disc 14, upon the splined portion 20, of shaft 8. Spacing washers 24 and a locknut 25, retain the disc 22 against axial movement relative to shaft 8. The disc 22 with its facing of friction material 23, cooperates with the flange 3, of the housing 1, to form a second, friction, energy absorbing means. In the normal position the discs 14 and 22 are spaced by the clearance distance a, from flanges 3 and 4.

The operation of the device of Fig. 1 is as follows: Casing 1 is held stationary by securing lug 2, to some stationary object and when a force is applied to lever 19 tending to cause clockwise rotation of the shaft 8, the shaft 8 will tend to move axially to the left as seen in Fig. 1. If there is no resistance to axial movement of shaft 8, all of the rubber bonded to the faces 9a and 9b, of the thread 9, will be placed in shear and the work done in deflecting the lever will be absorbed by the shear deformation of the rubber 10. When the deflection of the arm 19, has caused the shaft 8 to move axially to the left an amount equal to the clearance distance a, the friction surface 16, of the disc 14, will contact the annular flange 4 and further axial movement of the shaft 8, relative to the housing 1 will stop. Continued deflection of the arm 19 will cause the rubber bonded to the face 9a, of the thread 9, to be subjected to a large compressive stress, while the rubber bonded to the face 9b, of the thread 9, will be subject to a tensile stress. The work absorbed by the rubber will thus at first be due to shear stress and beyond a predetermined deflection of the lever 19, will be due to a combination of compression and shear and tension and shear stresses in the rubber. It will be seen that the work absorbed is a function of the amplitude of the relative rotation between the shaft 8 and the housing 1. In addition to the work absorbed by the rubber the friction material 16, on the face of the disc 14, causes work to be absorbed and dissipated in the form of heat and the friction work also increases as the amplitude of the deflection of the arm 19 increases, beyond a predetermined angle necessary to move the shaft 8 axially through the clearance distance a. The deformation of the rubber causes heat to be generated by internal friction and in combination with the heat generated by the friction device, causes a considerable percentage of the total energy absorbed to be dissipated in the form of heat.

When the arm 19 is rotated in a counterclockwise direction, as seen in Fig. 1, the rubber is stressed in exactly the same manner as above described except that the rubber bonded to the face $9a$ of thread 9, will carry a stress in tension and shear and the rubber bonded to the face $9b$, will be stressed in compression and shear. The friction disc 22 will cooperate with the flange 3, to serve as a friction absorbing means in the same manner as disc 14 so functions.

Where the device is to be used to absorb energy in only one direction of relative rotation between the casing and the shaft only one friction work absorbing means need be used.

It will be noted that as the screw thread 9 of shaft 8 is rotated, after disc 14 engages the flange 4, the rubber bonded to the face $9a$, of the thread 9 is compressed and decreases in cross-sectional area, but the thread 9 is still moving relative to the thread 7, of housing 1, causing an increased distance along the threads to accommodate the rubber displaced by the reduction in cross-sectional area. In the same manner, space for the displacement of the rubber due to tensile stress is provided.

To provide further space for rubber displacement, in some cases it may be desirable to employ the modified construction illustrated in Fig. 1a, in which the rubber 10, is provided with a recessed groove 10', located opposite a similar groove 9' cut in each face $9a$ and $9b$ of the thread 9 of shaft 8. It is of course understood that only one of the grooves 9' or 10' may be used if desired. Where the groove construction is employed, the casing 1 may be made in halves secured in assembled relation by suitable bolts and the rubber inserted in the housing halves in the form of preformed strips incorporating the grooves 10'. The housing halves are then assembled around the shaft 8 and the assembly heated to vulcanize the rubber and bond the same to the housing and shaft. The groove construction illustrated in Fig. 1a, is generally applicable to all of the devices shown as well as the embodiment disclosed in Fig. 1.

Where it is desired to use the device of Fig. 1 as a torsional vibration dampener, it is only necessary to secure the housing 1, to one member, such as an inertia disc and to connect the shaft 8 to a torsionally vibrating driving member, such as an engine crankshaft. The device will then operate to effectively damp out such torsional vibrations.

The device of Fig. 1 can be effectively used as a vibration damping coupling by connecting the housing 1 to rotate with a driving member and connecting the shaft 8 to rotate with a driven member. Torsional vibration in either the driving, or driven member, will be absorbed in the coupling due to the relative rotation between the housing and shaft of the coupling, due to torque variations permitting a smooth torque to be transmitted from the driving to the driven member.

The device of Fig. 1 is suitable for use as a shock absorber, by holding the housing 1 stationary relative to the structure upon which it is mounted and applying the shock load to be absorbed to an arm similar to the arm 19 shown in Fig. 1. The friction, energy absorbing means will materially reduce rebound due to release of the shock load.

Fig. 2 illustrates a modification of the device illustrated in Fig. 1, in which the friction stop means is replaced by a single anti-friction stop. The casing 1, is provided with an end wall 30, having a centrally disposed boss 31, formed thereon and having a threaded bore 32, in which is adjustably secured a threaded stop 33, retained in fixed position by a lock washer 40 and a lock nut 39. The inner end of the stop 33, is formed with a spherical surface 34, which engages the flat end 8', of the shaft 8. The shaft 8 and the housing 1 with threads 7 and 9 and the rubber yielding medium 10, are arranged in identical fashion, to that illustrated in Fig. 1. In operation the casing 1 remains stationary relative to the shaft 8. The flat end 8', of the shaft 8, is normally spaced from the stop surface 34, of the stop 33, so that the application of a torque to the shaft 8, by means such as the arm 19, of Fig. 1, will cause axial movement of shaft 8 to the left causing shear deformation and stress in the rubber 10. Upon the end 8', of shaft 8, engaging the surface 34, of stop 33, the rubber bonded to the face $9a$, of thread 9, will be compressed, while the rubber bonded to the face $9b$, of thread 9, will be tensioned in exactly the same manner as when arm 19 is rotated clockwise in Fig. 1. The spherical surface 34, of stop 33, permits further rotation of the screw without introducing any friction. The energy absorbed, is absorbed solely within the rubber and any energy dissipated is generated by internal friction within the rubber. The device of Fig. 2 is suitable for use in installations where shaft 8 will be rotated in one direction due to applied torque load and where the deflection is of such small magnitude that a friction energy absorbing means is not required.

The device disclosed in Fig. 3 is similar to the device of Fig. 1 except for the location of the friction stop. The device, similar to the device of Fig. 2 is shown for use with clockwise rotation of shaft 8. The housing 1 is provided with a closed end wall 30, having a boss 31, provided with a threaded bore 32, similar to the construction shown in Fig. 2. A threaded stop 35, adjustably retained by lock washer 40 and lock nut 39, is threaded into the boss 31 and at its inner end is provided with a disc like flange 36 having a facing of friction material 37 secured thereon, which cooperates with the flat end 8' of the shaft 8 to form a friction energy absorbing means similar in function to the friction stops of Fig. 1. The surface 8' is normally spaced a distance $a$ (Fig. 1), from the friction surface 37 and when the surfaces engage after a predetermined rotation of shaft 8, a portion of the energy absorbed will be dissipated by the friction surfaces in the same manner as in the device in Fig. 1. The rubber 10 will be stressed in a similar manner as in the clockwise rotation of shaft 8, in the device of Fig. 1.

Figure 4:
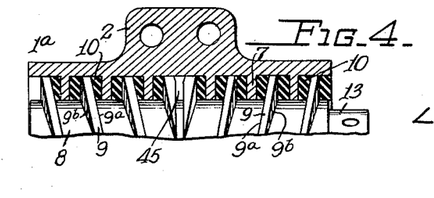
Fig. 4 is a view partly in section showing right and left hand threaded portions on the shaft and housing.
Figure 5:
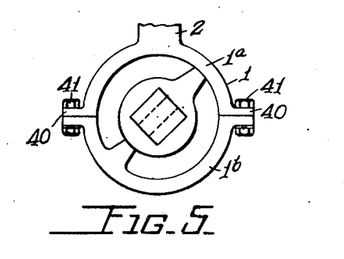
Fig. 5 is an end view of the device of Fig. 5 showing a split housing.

Figs. 4 and 5 illustrate a modified arrangement of the threads on the casing and shaft and in which a stop is not employed, the thread arrangement serving an equivalent function. The casing 1 is split into two halves, an upper half 1a, and a lower 1b, each half being provided with external flanges 40, which serve by means of bolts 41, to hold the casing in assembled relation. The casing 1 may be open at the ends if desired and the threads on the casing and shaft serve to journal the shaft in the casing as described with reference to Fig. 1. The thread 9, on the shaft 8, is split into two portions threaded in the opposite sense and leaving a central space 45, adjacent the inner terminal ends of the thread 9. The portion of the thread 9 to the right of the vertical center line, as seen in Fig. 5, is threaded left hand, while the portion of the thread 9, to the left of the vertical center line, is threaded right hand. The thread 7, of casing 1, is similarly formed into left hand and right hand threaded portions to cooperate with the corresponding thread element on shaft 8. The spaces between threads are filled with rubber 10 bonded with the threads 7 and 9, as in the modification Fig. 1.

The application of a clockwise turning moment to the shaft 8 will tend to cause axial movement of the shaft 8 to the left, due to the action of the right hand threaded portion of shaft 8, which movement will be opposed by the action of the left hand threaded portion of shaft 8, so that no axial movement will ensue, but the rotation of the shaft 8, will cause the rubber bonded to the faces 9a, of the threaded sections 9, to be compressed and the rubber bonded to the faces 9b, of the threaded sections 9, to be tensioned. Thus the deformation of the rubber is mainly tension and compression, and shear stresses arise only incident thereto similar to the operation of the device of Figure 1 after the stop is engaged.

In Figs. 6, 7, 8, 9, 10 and 11, there is illustrated a form of my device for use as a shock absorber for airplanes.

Figure 6:
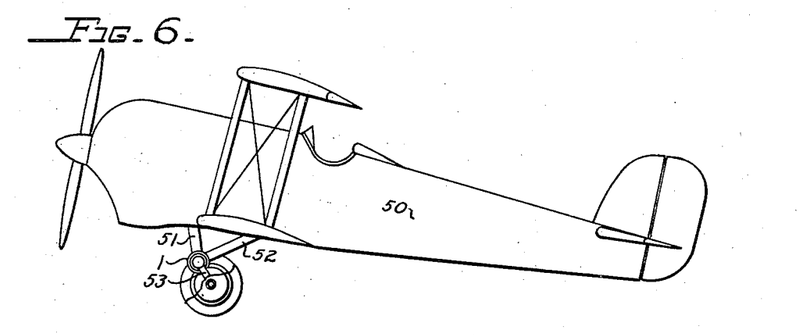
Fig. 6 is a side elevation view of an aeroplane, equipped with my mount as a shock absorber unit in the landing gear.

In Fig. 6 the airplane 50, has a rigid pair of V struts 51 and 52, secured to the airplane fuselage and serving as a mounting means for the casing 1, of a shock absorber similar to that shown in Fig. 1. The shock absorber shaft 8, is connected to a downwardly extending tube 53, which carries a suitable stub axle (not shown) for supporting a rubber tired wheel.

Figure 7:
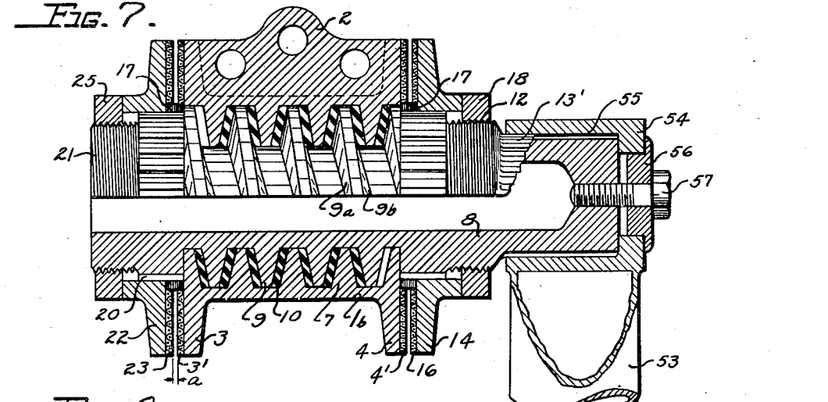
Fig. 7 is a view partly in section showing the shock absorber unit in normal condition.
Figure 9:
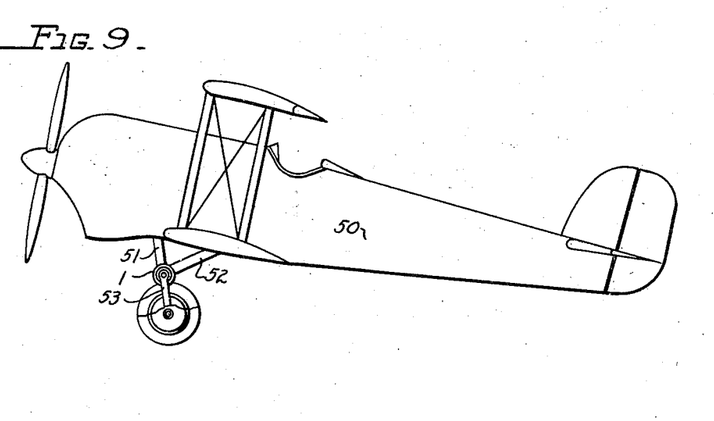
Fig. 9 is a view showing the shock absorber in the preloaded position.

As seen in Fig. 7, the shock absorber is similar in most respects to the general embodiment shown in Fig. 1, the casing 1, being split along its longitudinal center line into an upper half 1a, having the V strut attachment lugs 2 and 2', formed therewith and a lower half 1b. The upper and lower halves are each provided with abutting flanges 40, held together by bolts 41, to form a casing assembly similar to that described with reference to Fig. 4. The shock absorber unit is similar in all respects with the absorber shown in Fig. 1, except that the right hand end of the shaft 8, terminates in a splined end 13', which fits into a splined counter bore 55, of the fitting 54, formed in the end of the tube 53, which serves as a crank to transmit wheel deflection to the shaft 8 and rotate the shaft relative to the stationary housing 1. The tube 53, is held against longitudinal movement relative to the shaft 8, by means of a bolt 57, threaded into the end of the shaft 8, which in connection with the stop washer 56, holds the shaft 8 firmly seated in the counter bore 55, of the fitting 54. A further difference over the device shown in Fig. 1, is that the annular flanges 3 and 4 are each faced with a friction material, which serves to increase the friction work absorbing possibilities, when cooperating with the friction discs 14 and 22, respectively. In landing, the shock load deflects the wheels counterclockwise about the axis of shafts 8, as seen in Fig. 6. The rubber 10 will be deformed at first in shear, the shaft 8 tending to shift axially to the right, as seen in Fig. 7, until disc 22, has moved through the clearance distance a. Upon friction surfaces 3' and 23 coming in contact, further axial movement of the shaft 8 toward the right is prevented and continued rotation of the shaft will then compress the rubber bonded to the thread face 9b, of thread 9 and tension the rubber bonded to the face 9a, of thread 9. The rubber will then be stressed in tension and shear, on one side of the thread 9 and in compression and shear, on the other side of the thread 9 and simultaneously the friction surfaces 3' and 23, will be absorbing work in friction and dissipating such work in the form of heat. The greater the deflection of arm 53, the greater the work absorbed and energy is dissipated by friction, against the friction stop and internally within the rubber 10. The rubber in being stressed, is stressed substantially in a uniform manner, i. e. the shear stress throughout the depth of the thread has a nearly constant average value and the tension and compression stresses are applied uniformly throughout the depth of the helical thread faces bonded to the rubber. To prevent sudden rotation of the crank arm through an angle, in a clockwise direction past the initial position, the brake disc, or stop 14, will cooperate with flange 4 to dampen such deflections. The friction surfaces 16 and 4', dissipating energy in a rebound of the absorber past its normal position, the axial clearance between these friction surfaces being adjustable to a desired amount.

Where shock absorbers according to the invention are used in aircraft landing gears, it is desirable to have a large deflection and to increase the available deflection and this desired result may be attained by preloading the rubber in the absorber. To attain this result the rubber is preloaded to place a clockwise turning torque upon the shaft 8 and cause the landing gear when subject to the normal load when at rest on the ground to balance the wheel load torque applied to the absorber by the crank arm 53. The airplane with the absorber preloaded and the wheel in its normal position is shown in Fig. 9.

Figure 8:
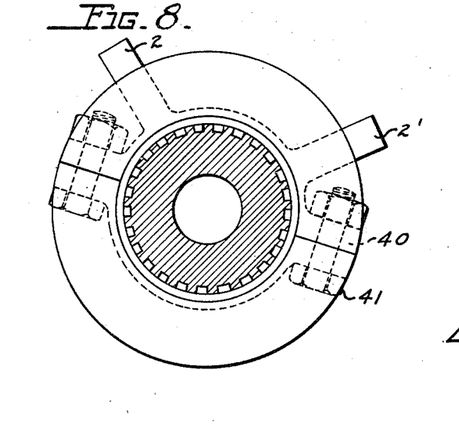
Fig. 8 is a view partly in section showing the split housing construction as used in Fig. 7.
Figures 10, 11:
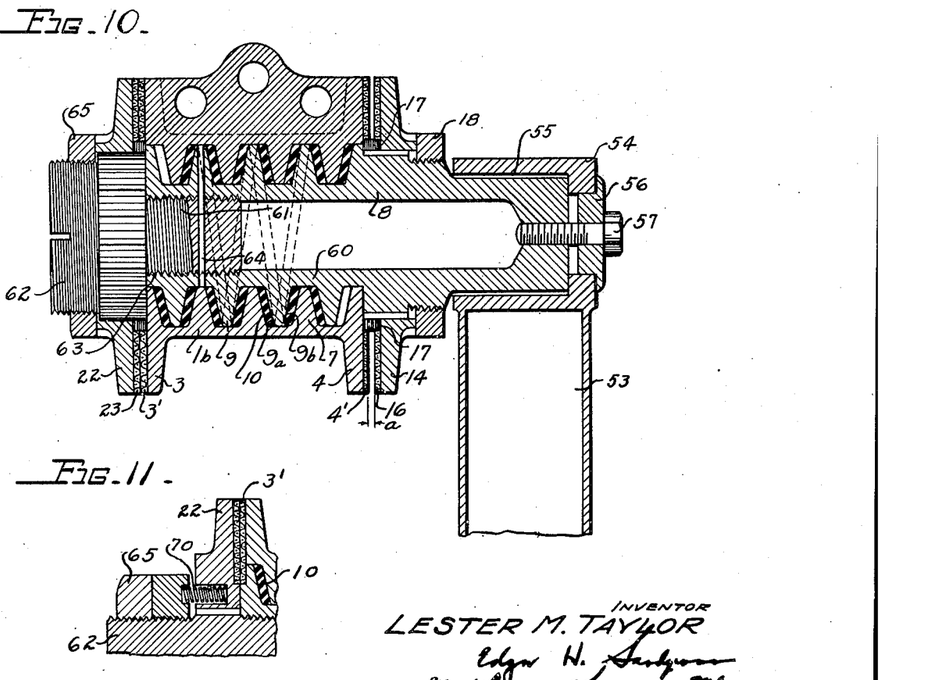
Fig. 10 is a view partly in section showing the device of Fig. 7 adapted for preloading of the resilient means.
Fig. 11 is a view partly in section showing a modification having a constant engagement of the friction means.

A convenient structure for preloading the absorber rubber 10 is shown in Fig. 10, in which the absorber is substantially identical to the absorber, as described with reference to Figs. 1, 7 and 8, except for the following changes. The shaft 8 is centrally counterbored as at 60 and at one end has an enlarged threaded counterbore 61, which has a threaded plug 62, screwed therein and retained by a transverse pin 64. The threaded plug 62, extends beyond the left end of the casing and a short splined portion thereof serves as a support for the friction stop 22, which has a splined bore 63, which permits the disc 22, to be axially adjusted along the support 62, a desired amount. A lock nut 65, retains the disc 22 in its adjusted position. The friction disc 14 is adjustably mounted on a splined portion 15, of the shaft 8 and retained spaced from the flange 4, a desired distance, by means of spacer washers 17 and lock nut 18 as in the device of Fig. 1. The thread 9 on the shaft 8 and the thread 7 on the housing 1, are formed as left hand threads, so that counterclockwise movement of arm 53, will cause axial movement of shaft 8 to the left, as seen in Fig. 10. By tightening nut 62 and disc 22 until the friction surfaces 3' and 23 engage, the shaft 8 will be moved axially to the left compressing the rubber 10, bonded to the face 9a, of the thread 9 and tensioning the rubber bonded to the face 9b, of the thread 9. The stressing of the rubber in this manner will cause a clockwise torque to act on the shaft 8 and arm 53, a desired amount, counteracting normal wheel load torque applied to the arm 53. When a landing shock load is applied to the wheel, it will tend to rotate the wheel counterclockwise, as seen in Fig. 9, which will also tend to cause axial movement of the shaft 8 to the left through the clearance distance a, but no actual axial movement will take place until the preloading tension and compression stresses are relieved, the whole load then being supported by shear stress in the rubber 10. Further movement of the shaft 8 to the left, due to counterclockwise rotation of the arm 53, will cause the friction surfaces 4' and 16 to engage with a subsequent stopping of further axial movement of the shaft 8. Continued rotation of the shaft 8 will then compress the rubber bonded to the face 9b, of the thread 9 and tension the rubber bonded to the face 9a, of the thread 9, the shear stress in the rubber 10 being combined with the tensile and compressive stresses in the manner previously described.

The rubber in the devices of Fig. 1 and Fig. 7 may be preloaded by removal of the spacing washers 17, on one of the friction discs and by means of the adjusting nut bring the disc into contact with the corresponding casing flange and further tightening of the adjusting nut will thus preload the rubber.

In Fig. 11, a modified form of friction stop means is shown, in which the stop 22, is axially slidable and held in contact with the friction surface 3', by means of springs 70, compressed by a movable abutment 71, threaded on the screw 62 of the device of Fig. 10 and retained by the lock nut 65. Such an arrangement permits preloading of the rubber, when used in the device of Fig. 10 and permits energy to be absorbed in friction in both directions of rotation of shaft 8 and arm 53, thus materially reducing rebound.

As heretofore noted, the invention is suitable for use in dampening vibration in a propeller drive and can be incorporated in an aircraft propeller hub structure to form an integral part thereof and such a hub construction is illustrated in Figs. 12 and 13. The construction is similar in most respects with the device illustrated in Fig. 1, but for convenience different reference numerals are used.

A main cylindrical hollow casing 70, is split along a vertical center line into similar halves 71 and 72, with annular end flanges 73 and 74, formed at the ends of the respective casing halves. Propeller blade hub sockets 75, are provided, these sockets being diametrically opposed and split on the vertical center line into similar opposed halves 76 and 77, which are formed as an integral part of the respective casing elements 71 and 72 and the annular flanges 73 and 74. Each blade socket is provided with a reduced diameter groove portion 78, which serves as a seat for a locking clamping ring (not shown) being well known in the art. The clamping rings serve to hold the hub in assembled relation and to lock propeller blades (not shown) by means of the recessed counter bores 79, against radial movement, the friction caused by the clamping, preventing rotation of the blades about the vertical axis. The casing elements 71 and 72, are each formed with an internal threaded projection 79 and 80, respectively, which when the casing halves are assembled form a continuous thread. Threaded into each casing half 71 and 72, is a hollow sleeve element 81 and 82, respectively. The sleeve elements 81 and 82 are externally threaded with threads 83 and 84, respectively. The threads in the casing and on the sleeve elements are made of such a width, that a considerable space is left on either side of the sleeve thread. These spaces are filled with rubber compound 90, with the exception of the housing portions adjacent the ends of the threads, which allows space for rubber displacement. The rubber is bonded to the threads on the casing and sleeve elements and a thin layer of rubber separates the sleeves from the housing at the apices of the threads serving as a yielding journal to cushion gyroscopic forces acting on the propeller in a plane perpendicular to the plane of rotation but if desired, the apices of the threads may serve as journals, as in Fig. 1. The hollow sleeves 82 and 83, are internally splined as at 92 and 93, respectively, which serve to transmit rotation to the propeller, from an aircraft engine crankshaft (not shown). Suitable stepped counter bores 94 and 95, are formed in the ends of the hollow sleeves 82 and 83, respectively. The counter bores 94, serve to engage a locking nut (not shown) and the counter bores 95, abut against a tapered portion of the crankshaft (not shown) to retain the sleeves against longitudinal displacement relative to the engine crankshaft. The sleeves 82 and 83 are formed with enlarged threaded portions 86 and 97, respectively, at their outer ends, which serve as supports for threaded annular discs 98 and 100, respectively and permit axial adjustment of the discs relative to the sleeve members. The discs 98 and 100 are each faced with friction material 101 and 102, respectively, the friction faces being spaced with a slight clearance from the faces of the respective annular flanges 73 and 74. Suitable bent wire keys 103 retain the discs 98 and 100 in adjusted position and prevent relative rotation between the discs and their corresponding sleeve members. Spanner wrench slots 104, permit the respective discs 98 and 100 to be adjusted when the keys are removed. The threads in the casing elements and on the sleeve elements are shown as left hand threads, but they need not be so formed.

In operation an engine crankshaft, not shown, transmits a torque, for example in a clockwise direction, as indicated by the arrow in Fig. 12, to the splines 92 and 93, of the sleeves 81 and 82, which will tend to cause the sleeves to rotate axially toward the right, as seen in Fig. 13. The tendency of the sleeves to rotate relative to the housing 70, will set up shear stresses in the rubber compound 90, which will transmit the engine torque to the housing or casing 70 to rotate the propeller blades. If the torque should vary above a definite value the sudden increase of torque will shift the sleeves 82 and 83 axially to the right sufficient to cause the friction surface 101, of disc 98, to engage the face of the annular flange 73 and prevent further axial movement of the sleeves. Continued rotation of the sleeves relative to the housing assembly, will cause the rubber 90, bonded to the right sides of the threads 79 and 80, to be compressed and the rubber bonded to the left sides of the threads will be stressed in tension. The tension and compression stresses will be accompanied by shear stress in the same manner as above described with reference to Fig. 1. The friction surface 101, dissipates energy in direct proportion to the relative angular displacement of the disc 98 and the amount of damping in the rubber and at the friction surface 101, will be directly proportional to the amplitude of the torsional vibration of the crankshaft. If the torque applied drops below a predetermined value the inertia of the propeller will cause it to overrun the engine crankshaft, causing the sleeve members 82 and 83, to rotate counterclockwise relative to the housing 70, which will cause the sleeves to move axially toward the left, causing unloading of the rubber 90 and release of friction surface 101, from engagement with the face of flange 73. The axial movement of the sleeves to the left, will then cause friction surface 102, to engage the face of annular flange 74, which will tend to dampen out such a torque variation and to transmit torque to the propeller by shear stress. If the torque variation is of such a decreased value in amplitude, as to cause further rotation of the sleeves 82 and 83, the rubber bonded to the left sides of the threads 79 and 80, will be compressed and the rubber bonded to the right sides of the threads 79 and 80, will be tensioned, the increased stress cushioning and dampening the torsional variation. The friction disc 100, can be spaced a desired amount, from the face of the annular flange 74, so that no substantial overrunning of the propeller, with respect to the engine crankshaft will occur, if such a result is desired.

I have thus provided a novel propeller hub, incorporating an integral vibration dampener in which the damping is proportional to the amplitude of the torsional variation and not dependent on the engine speed. The stresses in the rubber yielding material are substantially uniform throughout the material and thus utilize the energy absorbing characteristics of the material in the most efficient manner.

In any of the above described modifications the particular form of the helical flanges may be similar to any conventional thread form, such as a V, a square, or a buttress type thread.

While several preferred embodiments of the invention have been illustrated in the drawings many variations will be apparent to those skilled in the art and all such reasonable equivalents are deemed to fall within the scope of the invention as defined by the appended claims.

I claim:

1. A shock absorbing coupling device for connecting two relatively rotatable and relatively axially movable elements comprising; a secondary member, a helical flange on said secondary member, a primary member rotatably and axially movable relative to said secondary member, a helical flange on said primary member, said helical flanges being in concentric overlapping relation and at least one pair of opposed faces of said helical flanges being in spaced relation, a resilient material in the space between said helical flanges yieldingly opposing relative rotation of said members, and a stop means for limiting relative axial displacement of said members.

2. The structure as claimed in claim 1; wherein the stop means form a slipping friction connection between said primary and secondary members.

3. The structure as claimed in claim 1; wherein the stop means permits a predetermined relative axial displacement between said members before becoming effective.

4. The structure as claimed in claim 1; wherein the stop means includes a stop effective to limit relative axial movement of said members in one direction and a separate stop to limit relative axial movement of said members in the opposite direction.

5. A shock absorbing coupling device for connecting two relatively rotatable members comprising; a secondary member having a helical flange thereon, a primary member rotatable relative to the secondary member, a helical flange on the primary member, a resilient material between said flanges and serving as a yielding connection between said member, the periphery of the helical flange of one of said members being journalled in the other of said members.

6. A vibration damper comprising a driving member, a driven member, a resilient means connecting said members and serving to transmit a torque from one member to the other upon relative angular displacement of said members, means for transmitting said torque up to a predetermined relative angular displacement of said members substantially wholly by shear stress in said resilient means and means whereby said torque is thereafter transmitted by stressing said resilient material uniformly throughout in a plane normal to the plane of said shear stress, in addition to said shear stress.

7. A shock absorbing coupling device for connecting two relatively rotatable elements comprising; a primary member, a secondary member, said primary and secondary members being relatively rotatable, helical flanges on each of said members, said helical flanges being in concentric overlapping spaced relation, resilient material bonded to corresponding opposed faces of each of said helical flanges and serving to transmit a turning moment in part from said primary member to said secondary member upon relative rotation of said members substantially by shearing stress in said resilient material and means for simultaneously transmitting the remainder of said turning moment by subjecting said resilient material uniformly throughout to a compressive stress.

8. The structure as claimed in claim 7; wherein the means for simultaneously transmitting the remainder of said turning moment subjects said resilient material uniformly throughout to a tensile stress.

9. A means for coupling two relatively movable elements comprising; a primary member, a secondary member, said members being relatively rotatable, a right hand threaded portion on said primary member, a left hand threaded portion on said primary member, a right hand threaded portion on said secondary member, a left hand threaded portion on said secondary member, resilient means connecting said members bonded to the right hand threaded portions on said primary and secondary members and resilient connecting means bonded to the left hand threaded portions of said members, whereby turning moments are transmitted from said primary member to said secondary member, with said members remaining in a fixed axial relation.

10. A shock absorber for aircraft landing gears and the like comprising a casing, means for rigidly mounting said casing, a helical flange in said casing, a shaft journalled in said casing for rotation relative to said casing, an arm secured to said shaft for transmitting landing loads thereto, a threaded flange on said shaft, a resilient material located between the helical flanges bonded to the side faces of said helical flanges, a slipping friction connection between said shaft and said casing to prevent relative axial movement between said shaft and said casing for angular movement of said arm in one direction beyond a predetermined movement and an additional slipping friction connection between said shaft and said casing for limiting axial movement of said shaft relative to said casing when said arm rotates in the opposite direction.

11. A propeller hub comprising a hub casing, a sleeve journalled in said casing and adapted to be connected to a source of power, said sleeve being rotatable relative to said casing, a resilient material bonded to said casing and to said sleeve for resiliently transmitting torque from said sleeve to said casing, means for causing a portion of said torque to be transmitted by shear stress in said resilient material and means for transmitting the remainder of said torque by subjecting said resilient material to stresses in a plane substantially normal to the plane of said shear stress.

12. The structure as claimed in claim 11; including a slipping friction connection between the sleeve and the hub casing.

13. A shock absorber comprising a casing, a shaft relatively rotatable with respect to said casing, a helical flange on said casing, a helical flange on said shaft, said helical flanges being in concentric overlapping spaced relation, a resilient material between adjacent side faces of the flanges and bonded thereto for opposing relative movement of said shaft with respect to said casing by stress within said resilient material and means for creating an initial preloading stress in said resilient material.

14. A shock absorbing coupling device for coupling two relatively rotatable members comprising a secondary member, a helical flange on said secondary member, a primary member relatively rotatable and normally axially movable with respect to said secondary member, a helical flange on said primary member, said helical flanges being in concentric overlapping relation and at least one pair of opposed side faces of said helical flanges being in spaced relation, a resilient material in the space between said helical flanges and bonded thereto for yieldingly opposing relative motion between said members, stop means operative to limit axial movement between said members, said resilient material being subjected to a uniform compressive stress throughout by said helical flanges upon relative rotation between said members.

15. A shock absorbing coupling device for coupling two relatively rotatable members comprising a secondary member, a helical flange on said secondary member, a primary member relatively rotatable and normally axially movable with respect to said secondary member, a helical flange on said primary member, said helical flanges being in concentric overlapping relation and at least one pair of opposed side faces of said helical flanges being in spaced relation, a resilient material in the space between said helical flanges and bonded thereto for yieldingly opposing relative motion between said members, stop means operative to limit axial movement between said members, said resilient material being subjected to a uniform tensile stress throughout by said helical flanges upon relative rotation between said members.

16. A propeller hub comprising a hub casing containing an internal helical flange, a sleeve having an external helical flange thereon, said hub casing having means for securing propeller blades thereto and said sleeve being adapted to be connected to a source of power, a resilient material located between the flanges on said hub and said sleeve and bonded thereto for permitting a limited relative rotation in either direction between said sleeve and said hub, and means to limit the axial displacement of said hub relative to said sleeve in either direction upon a predetermined relative rotation of said hub relative to said sleeve.

LESTER M. TAYLOR.